Figure 1:
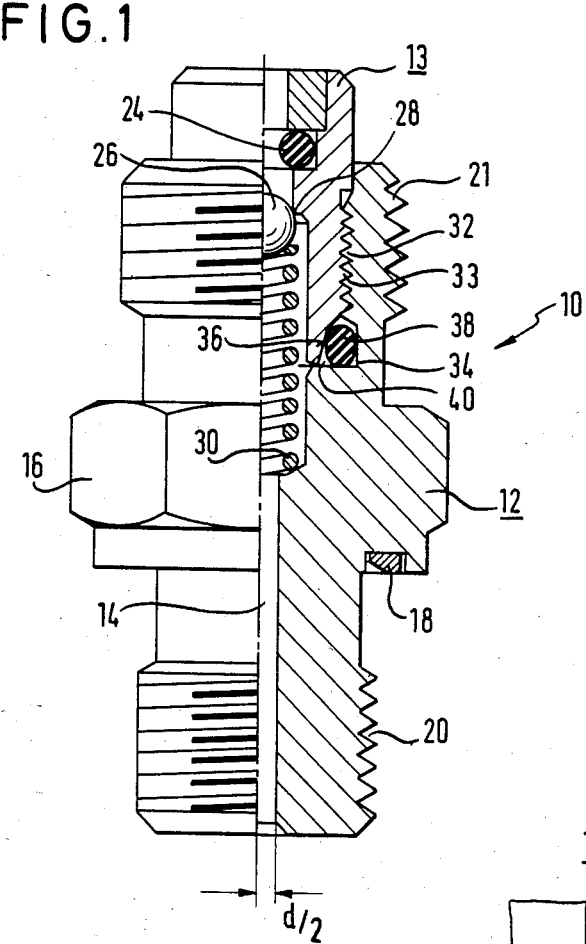

United States Patent [19]

Menshen

[11] Patent Number: 4,593,713
[45] Date of Patent: Jun. 10, 1986

[54] MEASUREMENT COUPLING

[76] Inventor: Arnold Menshen, Beulerweg 52, D-5982 Neuenrade, Fed. Rep. of Germany

[21] Appl. No.: 652,689

[22] Filed: Sep. 20, 1984

[30] Foreign Application Priority Data

Sep. 20, 1983 [DE] Fed. Rep. of Germany ........ 8327013

[51] Int. Cl.[4] .................. F16L 29/00; F16K 51/00
[52] U.S. Cl. .................. 137/322; 251/149.5; 251/149.6; 277/165; 277/170; 277/180; 277/236
[58] Field of Search ............ 137/322; 251/149.4, 251/149.5, 149.6, 149.8; 285/332.2, 332.3, 355; 277/165, 170, 180, 236

[56] References Cited

U.S. PATENT DOCUMENTS

| | | | |
|---|---|---|---|
| 1,626,729 | 5/1927 | Handlan, Jr. | 251/149.5 |
| 1,885,657 | 11/1932 | Walker | 251/149.4 |
| 2,493,996 | 1/1950 | Parmesan | 285/332.2 |
| 3,698,742 | 10/1972 | Jones et al. | 251/149.6 |
| 3,747,960 | 7/1973 | Bawa | 285/332.2 |
| 3,777,771 | 12/1973 | De Visscher | 251/149.6 |
| 3,847,819 | 11/1974 | Firth | 277/170 |
| 3,933,358 | 1/1976 | Hoer | 277/170 |
| 4,072,291 | 2/1978 | Adams | 137/DIG. 2 |
| 4,433,862 | 2/1984 | Raulins et al. | 285/355 |
| 4,458,925 | 7/1984 | Raulins et al. | 285/332.2 |
| 4,498,680 | 12/1985 | Schobbe | 277/180 |

FOREIGN PATENT DOCUMENTS

| | | | |
|---|---|---|---|
| 546074 | 3/1956 | Belgium | 251/149.4 |
| 203612 | 10/1983 | Fed. Rep. of Germany | 285/332.2 |
| 173580 | 12/1921 | United Kingdom | 137/322 |

Primary Examiner—G. L. Walton
Attorney, Agent, or Firm—Sughrue, Mion, Zinn, Macpeak, and Seas

[57] ABSTRACT

A measurement coupling with two end connections and a check valve which opens and closes a through bore of the measurement coupling in a controlled manner. The measurement coupling being constructed in two portions both of metal. The two portions be detachably connected to one another in such a way that they contact one another in a metal-to-metal relationship. A seal member being disposed between the two portions. The metal-to-metal seal prevents overloading of the seal member.

4 Claims, 2 Drawing Figures

MEASUREMENT COUPLING

The invention relates to a measurement coupling having two end connections and a check valve which opens and closes a through bore of the measurement coupling in a controlled manner.

Such a measurement coupling is used as a rapid coupling for pressure measurement and venting, and in particular for fluid systems. These measurement couplings may be connected under pressure, i.e. without having to shut the installation down, with the corresponding measurement systems. This measurement coupling may therefore be used for the measurement of high, low or negative pressures, for the venting of cylinders and hydraulic systems and for the extraction of gas and oil samples.

As a rule measurement couplings of this type are formed in one piece. If measurement couplings of this type are to be used in systems with particularly high requirements, for example in connection with the production of high pressures, wear may be produced in the area of the check valve with the result that the ball valve, for example, forming the check valve becomes inoperative.

If a corresponding material is selected, therefore, for the measurement coupling, the entire measurement coupling must be produced from this material, which leads to a considerable increase in the cost of the overall measurement coupling.

The British Patent Specification No. 173 580 discloses a measurement coupling having three parts, in which, however the part which receives the check valve is of rubber.

The object of the invention is to provide a measurement coupling such that the check valve is provided with a long service life, even in the case of high pressures, and such that reliable sealing is ensured.

This object is solved in accordance with the invention in that the measurement coupling has two portions and in that both portions are of metal and connected detachably to one another such that they contact one another in the axial direction in a sealed manner and in that a seal is provided between these portions.

As a result of the fact that the measurement coupling is in two parts and as a result of the use of metal as the material for the two portions, it is possible to form the portion which receives the check valve such that it is able to meet comparatively high requirements without the need for subsequent adjustment of the entire measurement coupling. In this respect it has proved advantageous to form a first seal by the metallic contact of the two portions in the axial direction, thereby protecting the additionally provided seal, which is in particular an elastomer seal, against overloading during the connection of the portions.

In an advantageous manner the portion receiving the check valve is of high-tensile steel so that the moving component, in particular a ball, used for the check valve, is reliably and permanently retained in the measurement coupling.

The elastomer seal is advantageously disposed in a chamber which is defined by the superposition of the two portions in the axial direction. This chamber is preferably bounded by a surface of compression of the portion containing the check valve, which surface extends obliquely with respect to the axial direction, and an area of the other portion which preferably forms a right angle.

The metallic contact advantageously takes place by means of a narrow edge in the shape of a circular ring of one portion, so that the two portions meet in the axial direction by contact of a circular line type. In this respect, the area of the first portion which is axially adjacent to the other portion is a circular ring edge which is formed in the area of transition between the surface of compression and a front oblique surface of the first portion. The two portions are preferably in threaded engagement with one another the first portion having an external thread and the other portion having an internal thread.

Figure 2:
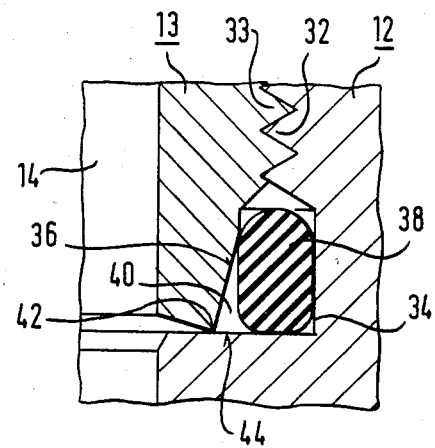

The invention is now described in further detail with reference to an embodiment, shown purely in very diagrammatic form in the drawings, in which:

FIG. 1 is a side view of a measurement coupling in two parts, in partial longitudinal section, FIG. 2 is a detailed view of the sealing area.

The measurement coupling 10 shown in FIG. 1 in its entirety basically comprises two portions 12 and 13. Both portions together form a through bore 14 extending through the measurement coupling. In the central area of the portion 12 there is an integrally formed hexagonal nut 16, on the lower side of which there is formed a seal 18. At both ends of the portion 12 there is a respective threaded connection 20 and 21, the threaded connection 20 serving as the connection to the line in which a pressure, for example, is to be measured. The other connection 21 is designed for the attachment of a portion, which opens the check valve which is described below, by means of a pin (not shown) which is inserted into the portion 13 and is therefore adjacent in a sealed manner to a seal 24 located in this portion.

The above-mentioned check valve comprises a ball bearing 26, for example, which is adjacent to a valve seat 28 of the portion 13 and is pressed against this seat by a spring 30, which is supported on the end of the portion 12 of the measurement coupling facing away from the ball bearing 26.

The two portions 12 and 13 are connected together by a thread engagement, for which purpose the portion 12 is provided with an internal thread 32 in the area of the connection thread 21 and the portion 13 is provided with an external thread 33 at this location. The internal thread 32 extends inwardly into a right-angled corner 34 and the external thread 33 extends into an oblique surface of compression 36 which is a conical ring surface which tapers into the interior of the measurement coupling. When the two portions are connected together via their thread engagement, there is an axial relative movement of the two portions until, after previous compression of an elastomer seal 38 into a chamber 40, the two portions 12 and 13 are in metallic contact, as can be seen from FIG. 2 in particular, in order to provide, on one hand, an additional metal seal and, on the other hand, to avoid overloading of the elastomer seal 38. In this respect, as can be seen from FIG. 2, the portion 13 makes circular line contact, by means of an edge in the form a circular ring 42, with a plane radial surface 44 of the portion 12.

I claim:

1. A measurement coupling device comprising a first coupling portion of metal having an axially directed through bore with internal screw threads extending along a portion of said bore and terminating at a flat radially directed shoulder, a second coupling portion of high tensile steel having an axially directed bore with valve means therein, said second coupling member having external screw threads disposed in threaded engagement with said internal screw threads and an end portion having an outer surface extending obliquely with respect to the axial direction and intersecting the bore therein to define a circular edge which engages said shoulder with circular line contact to limit movement of said second coupling member relative to said first coupling member, to provide a metal-to-metal seal and define a chamber between said first and second coupling portions and a seal member disposed in said chamber with said metal-to-metal seal preventing overloading of said seal member.

2. A measurement coupling as set forth in claim 1 wherein said seal member is comprised of an annular ring of elastomeric material.

3. A measurement coupling as set forth in claim 1 wherein said valve means is comprised of an annular valve seat disposed in the bore of said second coupling portion and a valve member disposed in the bore of said second coupling portion for movement into and out of engagement with said valve seat.

4. A measurement coupling as set forth in claim 3 wherein the bore in said first coupling portion has a diameter of approximately 1 mm which is reduced relative to the diameter of the bore in said second coupling portion to dampen the pressure impact applied to said valve member.

* * * * *